United States Patent [19]
Parker et al.

[11] Patent Number: 5,788,375
[45] Date of Patent: Aug. 4, 1998

[54] COLOR-CHANGING PASTA TIMER

[76] Inventors: Robert Parker, 212 Wild Horse Dr., Palm Desert, Calif. 92211; Robert Burton, 3009 Danalda Dr., Los Angeles, Calif. 90064

[21] Appl. No.: 625,943

[22] Filed: Mar. 29, 1996

[51] Int. Cl.[6] .............. G01K 11/12; G01K 13/00
[52] U.S. Cl. .............. 374/162; 374/156; 116/207
[58] Field of Search .................. 116/207, 216, 116/217; 374/134, 137, 161, 162, 208, 156

[56] References Cited

U.S. PATENT DOCUMENTS 4,137,769  2/1979  Parker ................ 374/162 X
4,738,549  4/1988  Plimpton .............. 374/161
5,326,174  7/1994  Parker ................ 374/134

FOREIGN PATENT DOCUMENTS 51-450  1/1976  Japan ................ 374/161

*Primary Examiner*—Thomas B. Will
*Assistant Examiner*—Willie Morris Worth
*Attorney, Agent, or Firm*—Renner, Otto, Boisselle & Sklar

[57] ABSTRACT

A floating cooking indicator, comprising first and second layers with a thermochromic material disposed therebetween, the first layer being transparent to permit viewing of the thermochromic material and the second layer including a plastic material with lower density particles dispersed therein.

7 Claims, 1 Drawing Sheet

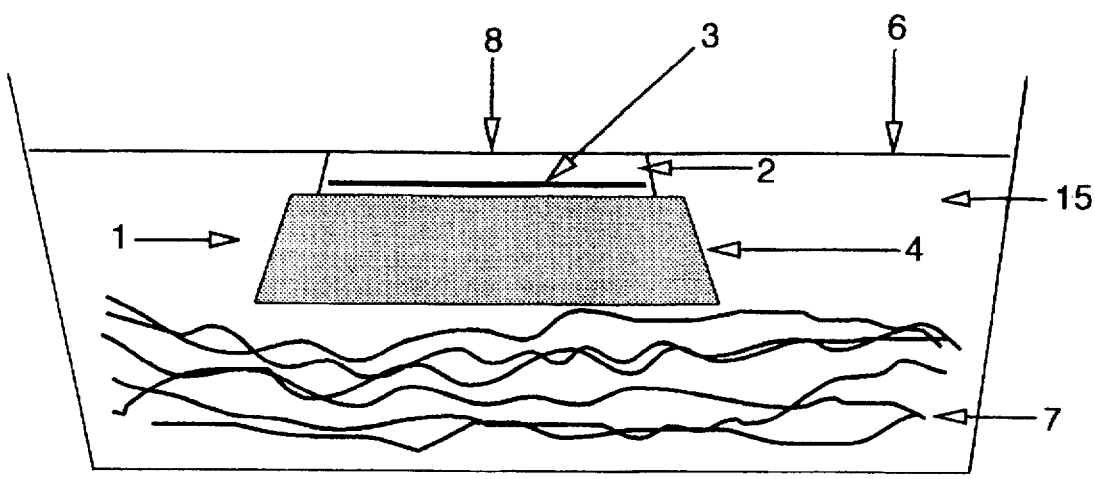
FIG. 1
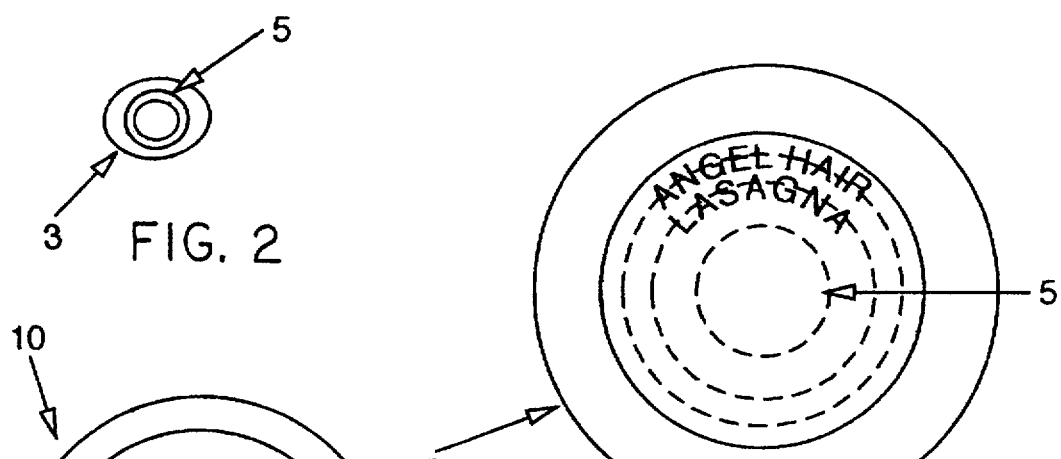
FIG. 2
FIG. 3
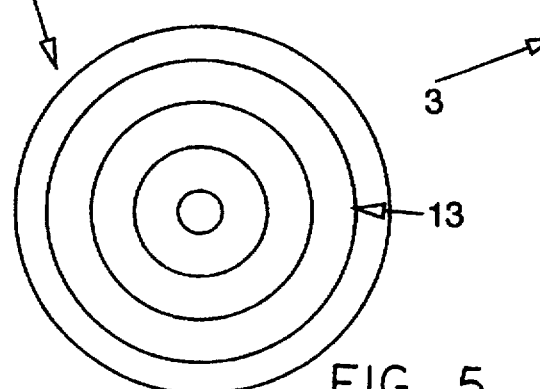
FIG. 5
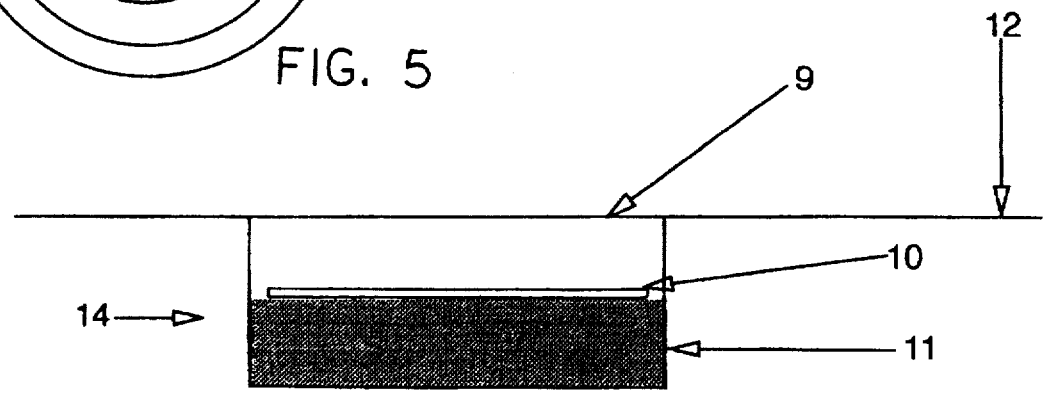
FIG. 4

COLOR-CHANGING PASTA TIMER

FIELD OF THE INVENTION

This invention relates generally to a floating time-temperature indicating device that is designed for the cooking of pasta, although it may be used for other cooking uses.

BACKGROUND OF THE INVENTION

In recent years various forms of pasta have become a popular food. The preparation of cooking of pasta can be quite variable because the pasta comes in many forms such as thin angel hair or thicker lasagna with the thicker material taking much longer to cook.

Usually water is brought to a boil and the pasta is placed in the pot. The amount of pasta, the amount of water, the altitude and other variables may affect the time required to cook the pasta.

It would be desirable to have an inexpensive and easy-to-read pasta timer that floated and could be placed in the boiling water at the same time as the pasta so that one may easily determine when the pasta is ready to eat.

SUMMARY OF THE INVENTION

The invention provides a pasta timer that floats so that it will not sink below the pasta and be obscured by the pasta. The floating pasta timer uses less material for thermal conductivity. Also heat conduction from the upper surface is decreased because it is in air and not in contact with hot water. Viewing and clean up are less of a problem. Although this indicator is primarily designed for pasta, other cooking applications such as vegetables, and other foods are possible.

The device uses a reversible thermochromic material that is sandwiched between two layers of plastic, typically using embedment or cold casting. The layer closest to the viewer is transparent and normally has a density somewhat larger than water. The embedded thermochromic material will have indicia showing the best cooking zones, indicia for various types of pasta.

In accordance with one embodiment of the invention, a device for indicating the cooking of foods includes a plastic lower density material with dispersed low density particles in conjunction with similar plastic clear materials and a thermochromic material.

In accordance with another embodiment of the invention, a floating cooking indicator includes first and second layers with a thermochromic material disposed therebetween, the first layer being transparent to permit viewing of the thermochromic material and the second layer including a plastic material with lower density particles dispersed therein.

BRIEF DESCRIPTION OF THE DRAWINGS

In the annexed drawings:

FIG. 1 is an illustration of a pasta timer in accordance with the invention floating in a pan of water and pasta;

FIG. 2 is a top view of the visual display portion of the timer of FIG. 1;

FIG. 3 is an enlarged view of the display portion of the timer with printed indicia;

FIG. 4 is an alternate embodiment of a pasta timer; and

FIG. 5 is a top view of the display portion of the timer of FIG. 4.

DETAILED DESCRIPTION OF THE INVENTION

FIG. 1 shows a floating pasta timer unit 1 in a pan of water 15 and pasta 7. The first layer 2 of the timer 1 may be a clear cast material such as a polyester casting resin as supplied by Polyester Chemical Corp. that may be cold cast with a cross linking "activator". When this layer hardens a thin "wetting" layer of casting resin is poured and a printed thermochromic insert 3 is placed in the center of the assembly. A final lower layer 4 is poured. This layer 4 preferably has glass micro balloons having a size generally on the order of 80 microns dispersed in the resin typically with 300 or so grams polyester to 20 or so grams glass micro balloons which renders it opaque white. A glass micro balloon is a commercially available hollow glass sphere. Other micro balloons may be used as well as low density foam. The layer 4 has a density less than water so that the entire assembly 1 will float with the front face 8 barely out of the water, but with the thermochromic layer fully immersed. The lower layer 4 would be preferably larger in diameter than the first layer so as to prevent tipping or roll over of the timer 1 in water.

While this is the preferred construction and application there are other embodiments and applications which would be understood to a person skilled in the art given this description and the drawings.

The thermochromic insert 3 may use various reversible thermochromics such as mercury salts that change from red to black at 68° C. or micro encapsulated dye systems such as those made by Matsui Corp. These may be printed and then overprinted with indicia 5 as shown in FIGS. 2 and 3 to indicate when the pasta is properly cooked. As the heat diffuses into the plastic layer 2 and insert 3 the color change will progress inward, from the outermost radius. One may thus visually determine whether the pasta is adequately cooked by examining how far radially inwardly the insert has changed colors.

The amount of and ratio of casting resin is chosen so that the timer 1 will float as shown in FIG. 1 with face 8 just slightly above the water level 6. Many experiments were performed and repeated cycling of the assembly showed no degradation of the assembly. A major concern was that thermal cycling would introduce cracks and fissures due to the dissimilar materials and voids in the plastic material with the micro balloons dispersed in the buoyant layer. This result was both surprising and positive. Other experiments with dissimilar materials such as the thermochromic layers showed a tendency towards delamination with repeated cycling. The timer 1 is typically subjected to severe thermal shock as it would be at room temperature and placed in boiling water. The fact that the micro balloons where dispensed in a homogeneous fashion prevented thermally initiated stress and cracking.

While casting is the preferred method of assembly it would be possible to bond dissimilar materials to achieve the same result as shown in FIG. 4.

Although the invention has been shown and described with respect to certain preferred embodiments, it is obvious other shapes will work. FIG. 4 shows a disc assembly timer 14 with a thermochromic material 10 and dispersed low density material in plastic 11 floating at water level 12. The thermochromic material 10 has indicia 13 as shown in FIG. 5 to facilitate a visual determination of the degree of cooking of the material in the pan with the timer 14. While cylindrical construction is shown other less preferred shapes will work.

Since heat flow is primarily in the radial direction the thickness of the first layer must be great enough to prevent substantial heat flow normal to the disc.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

We claim:

1. A floating cooking time-temperature indicator, comprising first and second layers with a thermochromic material disposed therebetween, the first layer being transparent to permit viewing of the thermochromic material and the second layer including a solid plastic material with glass micro balloons homogeneously dispersed therein to provide buoyance, wherein the shape of the second layer and its buoyancy cooperatively allow viewing of the thermochromic material when the device is floating in water.

2. The indicator of claim 1, wherein the plastic material of the second layer is generally transparent and the glass micro balloons render the second layer generally opaque.

3. The indicator of claim 1, wherein the first and second layers include similar plastic materials.

4. The indicator of claim 1, wherein an upper surface of the indicator remains generally above water and the thermochromic material remains generally below the water's surface when the indicator is floating in water.

5. The indicator of claim 1 or 4, wherein the first and second layers have generally circular cross-sections, the second layer having a larger diameter than the first layer.

6. The indicator of claim 1, wherein indicia are attached to the thermochromic material, the indicia thereby facilitating a visual determination of the degree of preparation of various foods.

7. A floating device for indicating the degree of cooking of foods comprising:

an upper transparent layer;

a lower opaque base layer;

and a thermochromic layer disposed therebetween;

wherein the base layer includes a polymer having glass micro balloons dispersed generally homogeneously therein to render the device buoyant in water and wherein the base layer is larger than the upper transparent layer to inhibit tipping, and wherein the device floats with a viewing surface near or above the water surface.

* * * * *